(12) United States Patent
Gibson et al.

(10) Patent No.: US 6,179,512 B1
(45) Date of Patent: Jan. 30, 2001

(54) COLLET NUT

(75) Inventors: Stephen E. Gibson, Columbia; William H. Aultman, Pickens, both of SC (US)

(73) Assignee: Power Tool Holders Incorporated, Christiana, DE (US)

( * ) Notice: Under 35 U.S.C. 154(b), the term of this patent shall be extended for 0 days.

(21) Appl. No.: 09/086,890

(22) Filed: May 29, 1998

(51) Int. Cl.$^7$ ..................................................... B23B 31/20

(52) U.S. Cl. ...................................... 403/374.1; 403/374.3; 403/350; 411/432; 411/917; 279/140

(58) Field of Search ................................ 403/373, 374.1, 403/374.2, 350, 371, 370, 368; 411/432, 917, 408; 279/140, 49, 56

(56) References Cited

U.S. PATENT DOCUMENTS

| 2,704,426 | 3/1955 | Macaulay . |
| 2,784,976 | 3/1957 | Ondeck . |
| 3,756,092 | 9/1973 | Gärtner . |

(List continued on next page.)

FOREIGN PATENT DOCUMENTS

| 163837 | 8/1949 | (DE) . |
| 3012836 C2 | 9/1985 | (DE) . |
| 3824040 C1 | 11/1989 | (DE) . |
| 3831236 A1 | 3/1990 | (DE) . |
| 3832624 C2 | 8/1990 | (DE) . |
| 3903765 A1 | 8/1990 | (DE) . |
| 3903766 A1 | 8/1990 | (DE) . |
| 3903767 A1 | 8/1990 | (DE) . |
| 4031725 A1 | 4/1992 | (DE) . |
| 4102420 A1 | 7/1992 | (DE) . |
| 4209146 A1 | 9/1992 | (DE) . |
| 4238466 C1 | 1/1994 | (DE) . |
| 4243328 C1 | 6/1994 | (DE) . |
| 4305317 A1 | 9/1994 | (DE) . |
| 0381809 A2 | 8/1990 | (EP) . |
| 0344154 B1 | 4/1992 | (EP) . |
| 0480163 A1 | 4/1992 | (EP) . |
| 0588483 A2 | 8/1993 | (EP) . |
| 0231500 B1 | 4/1994 | (EP) . |
| 2101513 | 3/1972 | (FR) . |
| 825877 | 12/1959 | (GB) . |
| 967516 | 8/1964 | (GB) . |
| 57-184610 | 11/1982 | (JP) . |
| 4-210308 | 7/1992 | (JP) . |
| 7-299742 | 11/1995 | (JP) . |
| 7-299743 | 11/1995 | (JP) . |
| 7-314328 | 12/1995 | (JP) . |
| WO8804975 | 7/1988 | (WO) . |
| WO8806075 | 8/1988 | (WO) . |
| WO9000463 | 1/1990 | (WO) . |
| WO9006210 | 6/1990 | (WO) . |
| WO9619677 | 6/1996 | (WO) . |
| WO9725542 | 7/1997 | (WO) . |
| WO9727020 | 7/1997 | (WO) . |

OTHER PUBLICATIONS

U.S. Patent application Ser. No. 08/971,757.
U.S. Patent application Ser. No. 09/016,220.

*Primary Examiner*—Lynne H. Browne
*Assistant Examiner*—John R. Cottingham
(74) *Attorney, Agent, or Firm*—Nelson Mullins Riley & Scarborough, LLP

(57) ABSTRACT

A collet nut has a nut member for threaded engagement with threads on a collet holder. A sleeve member is rotationally coupled to the nut member in a first tightening mode of the collet nut. An annular ring is rotationally coupled to the sleeve member and rotationally coupled to the nut member in the first tightening mode. Facing ramped bearing surfaces are defined between opposing faces of the annular ring and the nut member and bearing devices, such as balls, are disposed between the opposite faces. In the first tightening mode, the nut member and the annular ring rotate as a unit. In a second tightening mode, the annular ring rotates relative to the nut member so that opposing high sections of the ramped bearing surfaces are brought rotationally closer thereby forcing the annular ring axially away from the nut member which imparts an additional axial force to a collet engaging member of the collet nut.

21 Claims, 4 Drawing Sheets

U.S. PATENT DOCUMENTS

| | | |
|---|---|---|
| 3,894,743 | 7/1975 | Hiroumi . |
| 3,912,411 | 10/1975 | Moffat . |
| 4,176,582 | 12/1979 | Witte . |
| 4,322,190 | 3/1982 | Anderson . |
| 4,434,586 | 3/1984 | Müller et al. . |
| 4,525,097 | 6/1985 | Ziegelmeyer . |
| 4,637,170 | 1/1987 | Block . |
| 4,655,006 | 4/1987 | Block . |
| 4,841,796 | 6/1989 | Teramachi . |
| 4,850,154 | 7/1989 | Grammer et al. . |
| 4,864,884 | 9/1989 | Klinkenberg . |
| 4,941,790 | 7/1990 | Kirn . |
| 4,955,744 | 9/1990 | Barth et al. . |
| 4,976,071 | 12/1990 | Stäbler . |
| 4,980,994 | 1/1991 | Helm et al. . |
| 5,022,188 | 6/1991 | Borst . |
| 5,042,207 | 8/1991 | Kirn . |
| 5,044,643 | 9/1991 | Nakamura . |
| 5,161,334 | 11/1992 | Schaal et al. . |
| 5,175,963 | 1/1993 | Schäfer et al. . |
| 5,177,905 | 1/1993 | Takahashi . |
| 5,259,145 | 11/1993 | Fushiya et al. . |
| 5,261,679 | 11/1993 | Nakamura . |
| 5,388,942 | 2/1995 | Bonacina et al. . |
| 5,466,106 | 11/1995 | Bone et al. . |
| 5,494,368 | 2/1996 | Matthews . |
| 5,518,440 | 5/1996 | Bone . |
| 5,522,605 * | 6/1996 | Lewis et al. .................. 279/56 X |
| 5,545,078 | 8/1996 | Schulz et al. . |
| 5,567,100 | 10/1996 | Nakamura . |
| 5,577,872 | 11/1996 | Nakamura . |
| 5,584,753 | 12/1996 | Takahashi . |
| 5,651,726 | 7/1997 | Skogsberg . |
| 5,704,616 * | 1/1998 | Huff et al. .................. 279/140 X |
| 5,788,248 * | 8/1998 | Gibson .................. 279/140 X |
| 5,816,582 * | 10/1998 | Steadings et al. .................. 279/140 X |
| 5,829,762 * | 11/1998 | Claramunt et al. .................. 279/140 X |

* cited by examiner

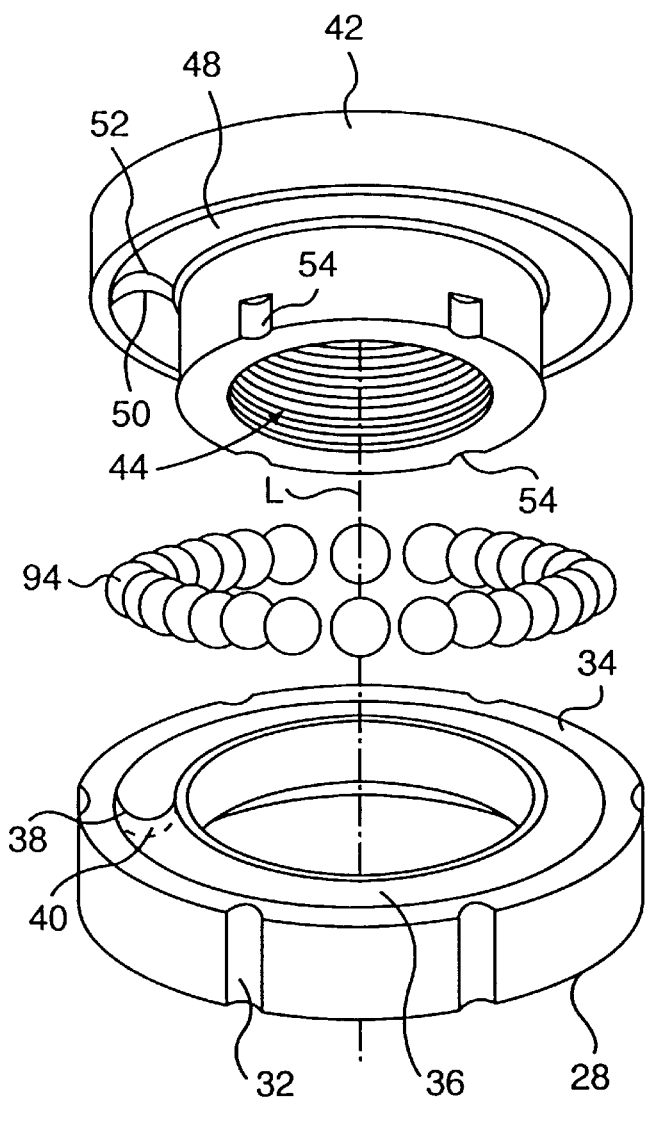
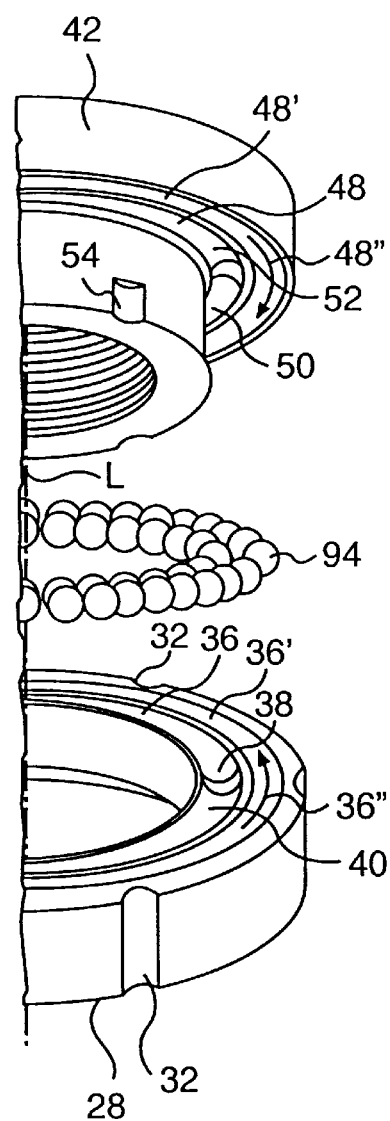
FIG. 4A  FIG. 4B

COLLET NUT

BACKGROUND OF THE INVENTION

The present invention relates to a system for actuating a conventional collet, and more particularly to a collet nut for actuating any manner of collet.

The use of tool holding collets is well known and understood in the art. With conventional systems, typically a body member, such as a drive spindle, defines a collet holder having a tapered bore for receipt of a collet. Conventional devices are also known wherein the spindle has a straight or untapered bore for receipt of the collet. The collet has a frusto-conical outer circumferential surface essentially matching that of the tapered bore. A threaded nut engages a front face or portion of the collet and forces the collet axially rearward into the tapered bore as the nut is threaded onto the collet holder. With the untapered bore devices, the collet has a tapered or frustoconical forward end that engages with a matching surface in the collet nut wherein the collet is actuated primarily by compressing the front end thereof instead of being forced axially into a tapered bore. These conventional systems typically require the use of an additional wrench or other tightening mechanism to apply the final tightening torque to the collet nut. Accordingly, an engaging face is defined on the collet nut for engagement with a wrench or similar device.

The use of external tightening devices, such as wrenches, can be time consuming and burdensome, particularly where the working area of the collet nut is limited or otherwise obstructed. Also, the operator must maintain the separate tightening wrench or device in close proximity, or at least be always aware of its location. Loss of the wrench can be quite frustrating and time consuming.

The present invention relates in particular to an improved collet nut wherein the final tightening force can be manually applied without the use of a wrench or other external tightening device.

OBJECTS AND SUMMARY OF THE INVENTION

It is therefore a principal object of the present invention to provide an improved collet nut wherein the nut can be tightened fully without the use of an external wrench or other tightening device.

An additional object of the present invention is to provide an improved collet tool holding device incorporating a collet nut that can be fully manually tightened.

Still another object of the present invention is to provide an improved collet nut for use with any manner of conventional collet.

Additional objects and advantages of the invention will be set forth in part in the following description, or may be obvious from the description, or may be learned through practice of the invention.

In accordance with the objects and purposes of the invention, an improved collet nut is provided for holding a collet in a chamber of a collet holder. The collet nut according to the invention is not limited to any particular type of collet and may be utilized with any collet or collet holding device or system wherein the collet is actuated by a collet nut which forces the collet into a tapered bore of a collet holder or compresses a forward end of the collet held in a straight bore. For example, the invention is particularly useful with conventional split-steel collets and Rubber-Flex® collets having individual jaw blades imbedded in a resilient material of Jacobs® Chuck Manufacturing Company used in tapered and untapered bore systems.

The collet nut according to the invention includes a nut member having a threaded inner diameter bore for engagement with threads on any conventional collet holder. As is commonly understood, the collet holder may incorporate a tapered inner diameter bore for receipt of the collet. The collet nut includes an operating member rotationally coupled to the nut member during a first tightening mode of the collet nut. In this first tightening mode, the operating member, which may include a sleeve member, is manually rotated in a tightening direction causing the nut member to threadedly advance on the collet holder. A collet engaging member is configured to engage and push a collet into the tapered chamber of the collet holder as the nut member advances on the collet holder, or to compress the collet radially inward with collet holders having untapered bores. This first tightening mode continues until a predetermined frictional load is reached between the nut member and the threads of the collet holder.

The collet nut incorporates a rotational disengaging system disposed operationally between the operating member and the nut member wherein upon reaching the predetermined frictional load between the nut member and the collet holder, the operating member rotationally disengages from the nut member as the operating member or sleeve is turned further in the tightening direction. Upon this disengagement, the collet nut enters a second tightening mode wherein a supplemental axial force generating mechanism imparts an additional axial force to the collet engaging member upon further rotation of the operating member without additional rotation of the nut member. Further rotation of the operating member imparts a rearward axial force to the operating member and collet engaging member thereby forcing the collet further into the tapered bore of the collet holder for the final manual tightening of the collet nut.

In a preferred embodiment of the invention, the rotational disengaging system comprises a resilient member, such as a click spring member, rotationally fixed to one of the operating member or the nut member and rotationally disengageable from the other of the operating member or nut member in the second tightening mode. For example, the click spring or resilient member may be rotationally fixed to the nut member and comprise resilient arms that releasably engage in recesses or slots defined in a sleeve member of the operating member. Operation of the resilient member may also be reversed wherein the resilient member is rotationally fixed to the operating member and releasably engaged with the nut member.

The operating member may comprise any combination of elements and, in a particularly preferred embodiment, the operating member comprises a sleeve member that is rotationally coupled to an annular ring member so that upon manual rotation of the sleeve member, the annular ring member also rotates.

A preferred supplemental axial force generating mechanism includes ramped surfaces defined on oppositely facing annular surfaces of the operating member and the nut member. For example, in the embodiment wherein the operating member includes the annular ring, the ramped surfaces may be defined on facing surfaces of the annular ring and the nut member. The ramped surfaces are circumferentially ramped from a low point to a high point. The ramps can have any degree of ramp depending on the particular design of the collet nut, and can be ramped through any arc of the circumference of the annular surfaces.

For example, the ramped surfaces may be continuously ramped over the entire circumference of the annular surfaces, or may be ramped only through a defined arc, such as 180°, of the annular surfaces. Bearing members, such as balls, are disposed in the ramped surfaces so that the operating member and nut member rotate relative to each other in the second tightening mode.

In the first tightening mode of the collet nut, the low sections of the ramped surfaces are axially opposite from each other and the operating member and nut member are rotated together until the frictional forces between the threads of the nut member and tool holder exceed the load of the disengaging system, such as the resilient member, between the operating member and the nut member. At this point, the nut member will cease to rotate upon further manual rotation of the operating member, and such further rotation of the operating member relative to the stopped nut member will cause the high point of the ramped surface on the operating member to rotationally approach the high point of the ramped surface on the nut member. As the high points rotationally approach each other, the operating member, for example the annular ring, is forced axially away from the nut member. This axial movement is transmitted through the operating member to the collet engaging member and thus imparts an additional axial force to the collet forcing the collet further into the tapered bore of the collet holder, or compressing the forward end of the collet even further. As should be understood, the additional tightening force can be varied depending on the degree of ramp of the ramped surfaces, or degree of rotation of the operating member relative to the nut member.

In one preferred embodiment of the invention, a single set of opposing ramped surfaces are provided, and the ramped surfaces are ramped essentially around the entire circumference of the facing annular surfaces. The degree of rotation of the operating ring in the second tightening mode is limited by stops defined between the operating ring and nut so that the opposing high points of the ramped surfaces are not over driven, which would result in the low portions again becoming axially aligned. In an additional preferred embodiment, it may be desired to have off-set sets of concentric ramped surfaces on each of the annular surfaces in order to counteract any undesired imbalance or cant of the operating member in the second tightening mode. For example, two sets of ramped surfaces may be provided wherein the high and low points of the respective sets are 180° out of face. This arrangement would ensure that movement of the operating member in the second tightening mode is in a plane essentially perpendicular to the axis of the collet nut.

The present invention also relates to a collet tool holding device incorporating the collet nut as described above. The tool holding device includes a tool holder having a tapered inner diameter bore for receipt of any type of collet, the collet having a matching tapered outer circumferential surface.

BRIEF DESCRIPTION OF THE DRAWINGS

FIGS. 4a and 4b are enlarged perspective assembly views of alternative embodiments of the ramped surfaces according to the invention.

DETAILED DESCRIPTION

Reference will now be made in detail to the presently preferred embodiments of the invention, one or more examples of which are illustrated in the figures. Each example is provided by way of explanation of the invention, and not meant as a limitation of the invention. For example, features illustrated or described as part of one embodiment can be used on another embodiment to yield still a third embodiment. It is intended that the present invention cover such modifications and variations as come within the scope and spirit of the invention.

Figure 1:
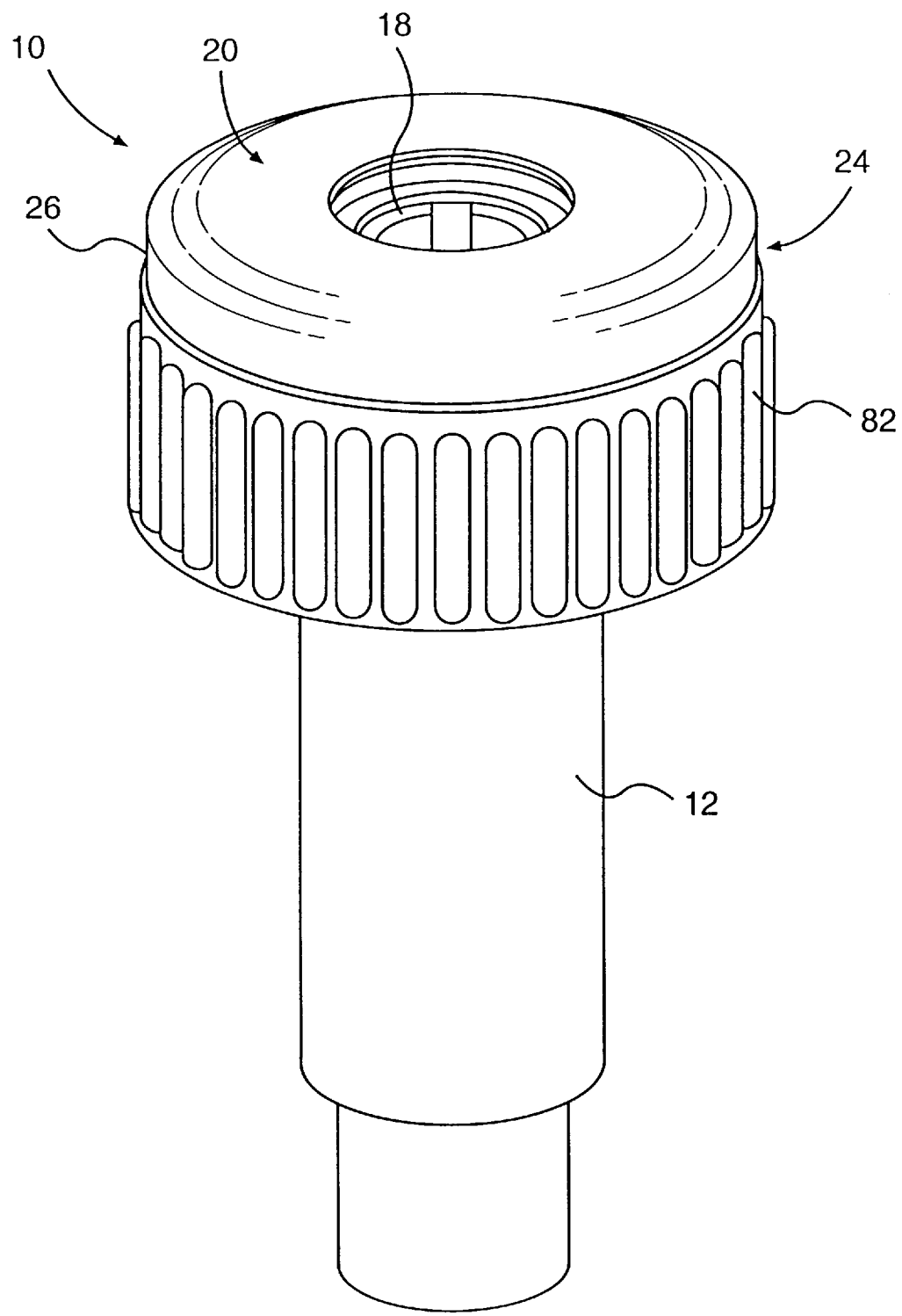
FIG. 1 is a perspective view of a tool holder incorporating a collet nut according to the invention.

Referring generally to FIG. 1., a tool holding device 10 is illustrated. Device 10 includes a conventional type of tool holder 12 having a tapered inner diameter bore 14 (FIG. 2) for receipt of any type of conventional collet 18. It should be understood that this type of tool holder with a tapered bore is exemplary only, and that the invention is not limited in this regard. Although not particularly illustrated in the figures, the present invention is just as applicable to tool holders having untapered bores wherein the collet is actuated primarily by radial compression of the forward end thereof. The invention will be described herein as it relates to use with a tapered bore tool holder for ease of explanation and description only.

As is commonly understood in the art, a collet nut is conventionally used to axially push or force collet 18 into tapered bore 14 so that the gripping members of collet 18 compress and grip upon a tool 92 (FIG. 2) inserted into the inner diameter of collet 18. These components and operating principles are conventional and well understood by those skilled in the art, and not critical to the invention.

It should be further appreciated that the present invention is not limited to any particular configuration of collet 18. For example, there are a number of conventional collets known and used in the art, for example split-steel collets and Rubber-Flex® collets (as described above) from Jacobs® Chuck Manufacturing Company. Collet nuts according to the invention may be used with any conventional collet or tool holder, including tapered bore and untapered bore tool holders.

Figure 2:
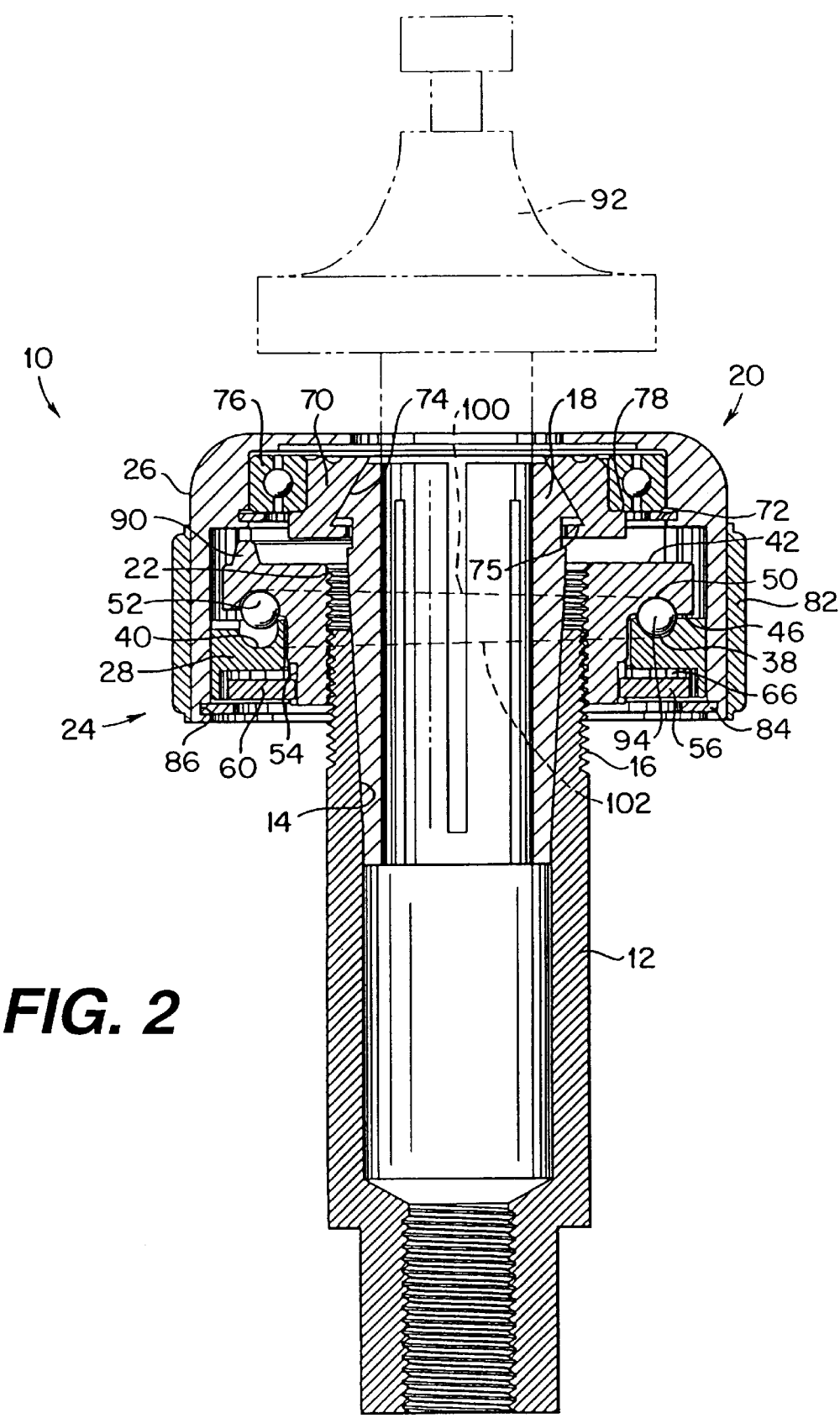
FIG. 2 is a cross-sectional view of the device illustrated in FIG. 1.
Figure 3:
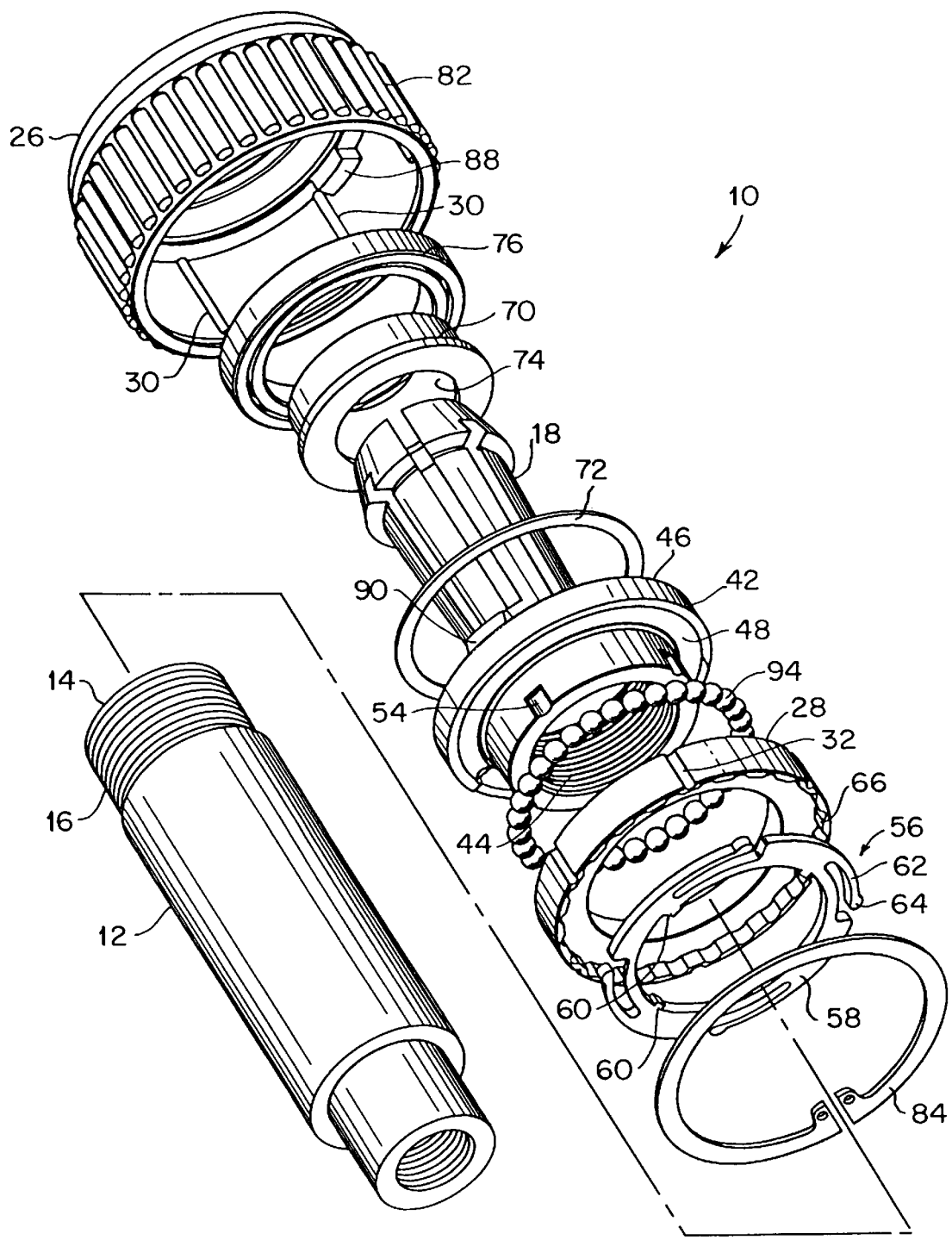
FIG. 3 is an in-line assembly view of the collet nut according to the invention.

Referring to FIGS. 2 through 4 in general, a collet nut 20 according to the invention is illustrated. Collet nut 20 includes a nut member 42 having a threaded inner diameter bore 44 for engagement with threads 16 on tool holder 12. An operating member, generally 24, is rotationally coupled to nut member 42 during a first tightening mode of collet nut 20, as will be described in greater detail below. A collet engaging member 70 is configured to engage and push collet 18 into tapered chamber or bore 14 of collet holder 12, or radially compress the forward end of collet 18 if the collet is seated in an untapered chamber, as nut member 42 is threadedly advanced onto threads 16 of collet or tool holder 12 upon rotation of operating member 24 in the first tightening mode. Collet engaging member 70 includes a frusto-conical inner diameter bore or surface 74 that matches the slope or taper of the forward end of any conventional collet 18, as commonly understood in the art. A conventional bearing device, such as bearing ring 76, may be utilized so that operating member 24 can rotate relative to collet engaging member 70. In the embodiment illustrated in FIG. 2, bearing ring 76 resides against a shoulder 78 defined in collet engaging member 70. Bearing ring 76 is retained within operating member 24 by means of a retaining clip or ring 72. Collet engaging member 70 also includes a radial lip 75 for removably retaining collet 18 therein.

In the embodiment illustrated in the figures, operating member 24 includes an outer rotatable sleeve 26. In a preferred embodiment, sleeve 26 may include a further grip enhancing surface or material such as the ribbed material 82.

A rotational disengaging system is disposed between operating member 24 and nut member 42 so that nut member 42 and operating member 24 rotate together in the first tightening mode of the device and rotationally disengage thereafter. In the embodiment illustrated, the rotational disengaging system comprises a resilient member 56 that is rotationally fixed to one of the operating member 24 or nut member 42. Resilient member 56 comprises a ring 58 having tangentially extending resilient arms 62. Arms 62 include rounded engaging ends 64. Ring 58 is rotationally coupled to nut member 42 by way of engaging dogs 60 that reside in engaging recesses 54 defined on an outer circumferential surface of nut member 42. Rounded ends 64 of resilient arms 62 engage in longitudinal engaging recesses 66 defined in an inner circumferential surface of an annular ring 28 incorporated in operating member 24. The operation of annular ring 28 will be described in further detail below.

Thus, in the embodiment illustrated, the resilient member 56 is rotationally fixed to nut member 42. However, resilient member 56 could just as easily be rotationally fixed to operating member 24 and releasably engaged with nut member 42.

As mentioned above, operating member 24 includes an annular ring 28 in the embodiment illustrated in the figures. Ring 28 is rotationally coupled to sleeve 26 by way of drive dogs 30 defined on the inner circumferential surface of sleeve 26 which engage in recesses 32 formed on the outer circumferential surface of annular ring 28. Thus, annular ring 28 is rotationally driven by, and axially movable relative to, sleeve 26 and releasably rotationally coupled to nut member 42 by way of resilient arms 62 of resilient member 56 engaging in recesses 66 defined in annular ring 28.

Collet nut 20 has a first operational tightening mode wherein all of the components are rotated as a single unit onto threads 16 of tool holder 12. At a certain degree of rotation, the frictional load between threads 16 and threaded inner diameter bore 44 of nut member 42 will exceed the load of resilient arms 62 within recesses 66. At this point, the rounded engaging ends 64 of arms 62 will release from recesses 66 defined in annular ring 28 and nut member 42 will cease to rotate upon further rotation of operating member 24, particularly sleeve 26. Collet nut 20 then enters a second tightening mode.

In the second tightening mode, a supplemental axial force generating mechanism comes into play to impart an additional axial force to collet engaging member 70 so that upon further rotation of operating member 24 after rotational disengagement of operating member 24 and nut member 42, collet 18 is forced even further axially into tapered chamber 14, or radially compresses the forward end of the collet even further.

In the embodiment illustrated in the figures, the supplemental axial force generating mechanism comprises a bearing device, such as balls 94 disposed between facing ramped surfaces 48, 36 of nut member 42 and annular ring 28 respectively. Referring to FIGS. 2 and 4 in particular, nut member 42 includes an annular flange or surface 46 having a circumferential ramped surface 48 defined therein. In the illustrated embodiment, ramped surface 48 is ramped 360° circumferentially from a high point 50 to a low point 52. In other words, high point 50 and low point 52 are directly adjacent each other with the degree of ramp extending 360° around the circumference of annular flange or surface 46. In FIG. 2, the dashed line 100 indicates the degree of ramp from high point 50 to low point 52 of ramped surface 48.

Annular ring 28 includes a similar ramped surface 36 defined in an annular flange or surface 34. Ramped surface 36 is ramped from high point 38 to low point 40. Dashed line 102 in FIG. 2 indicates the degree of ramp from high point 38 to low point 40. As with nut member 42, the high and low points 38, 40 are disposed adjacent each other so that the ramp extends essentially about 360°.

Referring particularly to FIG. 4a, in the first tightening mode of collet nut 20, annular ring 28 and nut member 42 are rotationally aligned so that high point 50 of nut ring 42 is directly opposite from low point 40 of annular ring 28. Likewise, high point 38 of annular ring 28 is directly opposite of low point 52 in nut member 42. In this alignment, the annular ring 28 and nut ring 42 are as close together axially as they can be. Upon rotational disengagement of nut member 42 and annular ring 28 and further rotation of sleeve 26 in a tightening direction, high point 38 of annular ring 28 will be driven in a rotational direction towards high point 50 in the now stationary ramped surface 48 of nut member 42. As the two high points are drive rotationally towards each other, annular ring 28 is forced axially away from nut member 42. Thus, annular ring 28 moves axially rearward within collet nut 20. This axial rearward movement is converted into an axial driving force when operating ring 28 engages a stationary member, such as retaining ring 84, of sleeve 26. In other words, as sleeve 26 is rotated in a tightening direction, annular ring 28 is moved axially rearward and, upon engagement with retaining 84, drives sleeve 26 axially rearward which, in turn, causes collet engaging member 70 to force collet 18 even further into tapered bore 14, or to additionally compress the forward end of collet 18.

In order to release collet nut 20, the operation is simply reversed and sleeve 26 is rotated in a loosening direction causing the low points of ramped surfaces 36, 48, to rotationally align. In this configuration, annular ring 28 moves axially towards nut member 42 and the tightening force on collet 70 is relaxed. The engaging force of resilient arms 62 will overcome the frictional load between threads 16 and threaded bore 44 and the entire collet nut 20 will then rotate as an integral unit.

Applicants have found that a single ramped surface defined in the opposing annular surfaces or flanges of nut member 42 and annular ring 28 is particularly useful and relatively cost efficient without imparting an imbalance to the system. In a preferred embodiment of the invention, the ramped surfaces are ramped generally within a range of about 0.060 to about 0.070 inches from the high to low points. However, even with this slight degree of ramp, applicants have found that a sufficient supplemental axial force is generated through rotation of sleeve 26, and thus operating ring 28, through a degree of rotation of less than 180°. In this regard, rotational stops 88 defined on the inner surface of sleeve 26 and 90 defined on nut member 42 prevent rotation of sleeve 26 beyond 180° relative to nut member 42 to prevent over-tightening and possible binding of the device.

It should be appreciated by those skilled in the art that the degree of ramp can be varied widely depending on the desired supplemental axial force or location of high and low points. For example, is not a requirement of the invention that the high and low points lie adjacent to each other. Also, rotational stops 88, 90 can be disposed to limit the degree of rotation within any desired arc. All such embodiments and variations are within the scope and spirit of the invention.

An alternative preferred embodiment of the ramped surfaces is illustrated in FIG. 4b. In this embodiment, concentric ramped surfaces are defined on each of nut 42 and annular ring 28. Each ramped surface has a high and low point which are radially opposite from the high and low point of the adjacent concentric ramp. For example, referring to nut 42 in FIG. 4b, two concentric ramped surfaces 48 and 48' are illustrated. Inner ramp 48 has a high point 50 adjacent to a low point 52. Outer ramp 48' also has a high and low point that are 180° opposite from the high and low point of the inner ring and are thus not seen in the figure. Outer ramp 48' is ramped from the high to low point in the direction of arrow 48". Likewise, referring to annular ring 28 in FIG. 4b, inner ramped surface 36 is ramped from high point 38 to low point 40. Outer ramped surface 36' is ramped from a high point that is 180° opposite from high point 38 to an adjacent low point in the direction of arrow 36". With this arrangement of concentric ramped surfaces, it is ensured that annular ring 28 moves in a plane that is perpendicular to axis L as the annular ring is rotated through any arc relative to nut member 42 since the annular ring is being forced axially away from nut member 42 at two points that are 180° out of phase.

It should be appreciated by those skilled in the art that various modifications and variations can be made in the present invention without departing from the scope and spirit of the invention. For example, as discussed, the degree of ramp between the ramped surfaces, and configuration of the ramped surfaces, may be varied widely within the spirit of the invention. It is intended that such modifications and variations are included in the present invention as come within the scope and spirit of the appended claims.

What is claimed is:

1. A collet nut for holding a collet in a tapered chamber of a collet holder, said collet nut comprising:
    a nut member having a threaded inner diameter bore engageable with threads on a collet holder;
    a sleeve member rotationally coupled to said nut member during a first tightening mode of said collet nut;
    a collet engaging member configured to engage a forward end of a collet seated in a chamber of a collet holder, said nut member threadedly advanceable on a collet holder upon rotation of said sleeve member to cause said collet engaging member to engage a collet seated therein;
    an annular ring rotationally coupled to said sleeve member and rotationally coupled to said nut member during said first tightening mode;
    facing ramped bearing surfaces defined between opposing faces of said annular ring and said nut member, and bearing devices seated in said ramped bearing surfaces; and
    wherein in said first tightening mode said sleeve member, said nut member, and said annular ring rotate as a unit, and in a second tightening mode said sleeve member and said annular ring rotate relative to said nut member so that opposing high sections of said ramped bearing surfaces are brought rotationally closer together thereby forcing said annular ring axially away from said nut member which imparts an additional axial force through said collet engaging member to a collet held within said collet nut.

2. The collet nut as in claim 1, wherein said nut member comprises an annular flange section with one of said ramped bearing surfaces defined thereon, said annular ring comprising a facing annular flange section with the other of said ramped bearing surfaces defined thereon.

3. The collet nut as in claim 1, wherein said ramped bearing surfaces are ramped in a circumferential direction from a low point to said high point, in said first tightening mode said low points disposed opposite each other.

4. The collet nut as in claim 3, wherein said ramped bearing surfaces are ramped about 360 degrees circumferentially from said low point to said high point.

5. The collet nut as in claim 3, wherein said ramped bearing surfaces are ramped about 180 degrees circumferentially from said low point to said high point.

6. A collet nut for holding a collet in a tapered chamber of a collet holder, said collet nut comprising:
    a nut member having a threaded inner diameter bore engageable with threads on a collet holder;
    a sleeve member rotationally coupled to said nut member during a first tightening mode of said collet nut;
    a collet engaging member configured to engage a forward end of a collet seated in a chamber of a collet holder, said nut member threadedly advanceable on a collet holder upon rotation of said sleeve member to cause said collet engaging member to engage a collet seated therein;
    an annular ring rotationally coupled to said sleeve member and rotationally coupled to said nut member during said first tightening mode;
    facing ramped bearing surfaces defined between opposing faces of said annular ring and said nut member, and bearing devices seated in said ramped bearing surfaces;
    wherein in said first tightening mode said sleeve member, said nut member, and said annular ring rotate as a unit, and in a second tightening mode said sleeve member and said annular ring rotate relative to said nut member so that opposing high sections of said ramped bearing surfaces are brought rotationally closer together thereby forcing said annular ring axially away from said nut member which imparts an additional axial force through said collet engaging member to a collet held within said collet nut; and
    further comprising a resilient member rotationally coupling said annular ring to said nut member in said first tightening mode, said resilient member rotationally releasing from one of said annular ring or said nut member in said second tightening mode so that said annular ring rotates relative to said ring member in said second mode.

7. The collet nut as in claim 6, wherein said resilient member comprises radially extending resilient arm members engaging in recesses defined in one of said annular ring and said nut member.

8. The collet nut as in claim 6, wherein said resilient member is rotationally fixed to said nut member and said recesses are defined in said annular ring.

9. The collet nut as in claim 1, wherein said collet engaging member comprises a retaining ring having an inside diameter surface matching a front surface of a collet to be held therein, and further comprising a bearing device disposed between said sleeve member and said retaining ring.

10. A collet nut and collet holder combination, comprising:
    a collet holder having a tapered chamber for receipt of a collet therein;
    a nut member having a threaded inner diameter bore engageable with threads on said collet holder;
    an operating member rotationally coupled to said nut member during a first tightening mode of said collet nut;

a collet engaging member configured on said nut member to engage a forward end of a collet seated in said tapered chamber of said collet holder, said nut member threadedly advanceable on said collet holder upon rotation of said operating member in a first tightening mode to cause said collet engaging member to engage a collet seated therein;

a rotational disengaging system disposed operationally between said operating member and said nut member wherein upon reaching a predetermined load between said nut member and said collet holder said operating member rotationally disengages from said nut member in a tightening rotational direction;

a supplemental axial force generating mechanism operational in a second tightening mode to impart an additional axial force to said collet engaging member upon further rotation of said operating member after rotational disengagement of said operating member and said nut member in said first tightening mode thereby forcing a collet engaged by said collet engaging member further into said tapered chamber of said collet holder.

11. The combination as in claim 10, wherein said rotational disengaging system comprises a resilient member rotationally fixed to one of said operating member and said nut member and rotationally disengageable from the other of said operating member and said nut member in said second tightening mode.

12. The combination as in claim 11, wherein said operating member comprises an annular ring member rotationally coupled to an outer sleeve member.

13. The combination as in claim 12, wherein said nut member comprises an annular flange oppositely facing from said annular ring member, said supplemental axial force generating mechanism disposed between said nut member annular flange and said annular ring member.

14. A collet nut for holding a collet in a tapered chamber of a collet holder, said collet nut comprising:

a nut member having a threaded inner diameter bore engageable with threads on a collet holder;

an operating member rotationally coupled to said nut member during a first tightening mode of said collet nut;

a collet engaging member configured to engage a forward end of a collet seated in a chamber of a collet holder, said nut member threadedly advanceable on a collet holder upon rotation of said operating member in a first tightening mode to cause said collet engaging member to engage a collet seated therein;

a rotational disengaging system disposed operationally between said operating member and said nut member wherein upon reaching a predetermined load between said nut member and the collet holder said operating member rotationally disengages from said nut member in a tightening rotational direction;

a supplemental axial force generating mechanism operational in a second tightening mode to impart an additional axial force to said collet engaging member upon further rotation of said operating member after rotational disengagement of said operating member and said nut member in said first tightening mode thereby forcing a collet engaged by said collet engaging member further into the tapered bore of the collet holder;

said rotational disengaging system comprising a resilient member rotationally fixed to one of said operating member and said nut member and rotationally disengageable from the other of said operating member and said nut member in said second tightening mode;

said operating member comprising an annular ring member rotationally coupled to an outer sleeve member;

said nut member comprising an annular flange oppositely facing from said annular ring member, said supplemental axial force generating mechanism disposed between said nut member annular flange and said annular ring member; and wherein said supplemental axial force generating mechanism comprises ramped surfaces defined on said oppositely facing annular flange and annular ring member, and bearing devices disposed in said ramped surfaces, said ramped surfaces ramped in a circumferential direction from a low point to a high point wherein upon further rotation of said operating member relative to said nut member in said second tightening mode, said high points of said ramped surfaces rotationally approach thereby forcing said operating ring axially away from said nut member and imparting addition axial force to said collet engaging member.

15. A collet nut for holding a collet in a tapered chamber of a collet holder, said collet nut comprising:

a nut member having a threaded inner diameter bore engageable with threads on a collet holder;

an operating member rotationally coupled to said nut member during a first tightening mode of said collet nut;

a collet engaging member configured to engage a forward end of a collet seated in a chamber of a collet holder, said nut member threadedly advanceable on a collet holder upon rotation of said operating member in a first tightening mode to cause said collet engaging member to engage a collet seated therein;

a rotational disengaging system disposed operationally between said operating member and said nut member wherein upon reaching a predetermined load between said nut member and the collet holder said operating member rotationally disengages from said nut member in a tightening rotational direction;

a supplemental axial force generating mechanism operational in a second tightening mode to impart an additional axial force to said collet engaging member upon further rotation of said operating member after rotational disengagement of said operating member and said nut member in said first tightening mode thereby forcing a collet engaged by said collet engaging member further into the tapered bore of the collet holder;

wherein said supplemental axial force generating mechanism comprises ramped surfaces defined on said oppositely facing annular surfaces of said operating member and nut member, and bearing devices disposed in said ramped surfaces, said ramped surfaces ramped in a circumferential direction from a low point to a high point wherein upon further rotation of said operating member relative to said nut member in said second tightening mode, said high points of said ramped surfaces rotationally approach thereby forcing said operating member axially away from said nut member and imparting addition axial force to said collet engaging member.

16. A collet tool holding device, comprising:

a tool holder having an inner diameter bore for receipt of a collet therein, said tool holder having a threaded outer diameter;

a collet nut in threaded engagement with said tool holder for actuating a collet seated in said bore, said collet nut further comprising
- a nut member having a threaded inner bore for engagement with said threads on said tool holder;
- an operating member rotationally coupled to said nut member during a first tightening mode of said collet nut;
- a collet engaging member configured to engage a collet in said bore of said tool holder as said nut member threadedly advances on said tool holder with rotation of said operating member in a first tightening mode;
- a rotational disengaging system disposed operationally between said operating member and said nut member wherein upon reaching a predetermined load between said nut member and said threads on said tool holder, said operating member rotationally disengages from said nut member in a tightening rotational direction; and
- a supplemental axial force generating mechanism operational in a second tightening mode to impart an additional axial force to said collet engaging member upon further rotation of said operating member after rotational disengagement of said operating member and said nut member in said first tightening mode.

17. The collet tool holding device as in claim 16, wherein said rotational disengaging system comprises a resilient member rotationally fixed to one of said operating member and said nut member and rotationally disengageable from the other of said operating member and said nut member in said second tightening mode.

18. The collet tool holding device as in claim 17, wherein said operating member comprises an annular ring member rotationally coupled to an outer sleeve member.

19. The collet tool holding device as in claim 18, wherein said nut member comprises an annular flange oppositely facing from said annular ring member, said supplemental axial force generating mechanism disposed between said nut member annular flange and said annular ring member.

20. The collet tool holding device as in claim 19, wherein said supplemental axial force generating mechanism comprises ramped surfaces defined on said oppositely facing annular flange and annular ring member, and bearing devices disposed in said ramped surfaces, said ramped surfaces ramped in a circumferential direction from a low point to a high point wherein upon further rotation of said operating member relative to said nut member in said second tightening mode, said high points of said ramped surfaces rotationally approach thereby forcing said operating ring axially away from said nut member and imparting addition axial force to said collet engaging member.

21. The collet nut as in claim 16, wherein said supplemental axial force generating mechanism comprises ramped surfaces defined on said oppositely facing annular surfaces of said operating member and nut member, and bearing devices disposed in said ramped surfaces, said ramped surfaces ramped in a circumferential direction from a low point to a high point wherein upon further rotation of said operating member relative to said nut member in said second tightening mode, said high points of said ramped surfaces rotationally approach thereby forcing said operating member axially away from said nut member and imparting addition axial force to said collet engaging member.

* * * * *